United States Patent [19]
Ohlrogge et al.

[11] Patent Number: 6,059,856
[45] Date of Patent: May 9, 2000

[54] METHOD AND APPARATUS FOR REDUCING EMISSIONS FROM BREATHER LINES OF STORAGE TANKS

[75] Inventors: Klaus Ohlrogge, Geesthacht; Jan Wind, Lauenberg, both of Germany

[73] Assignee: GKSS-Forschungszentrum Geesthacht GmbH, Geesthacht, Germany

[21] Appl. No.: 08/732,340

[22] PCT Filed: Mar. 22, 1995

[86] PCT No.: PCT/DE95/00383

§ 371 Date: Apr. 10, 1997

§ 102(e) Date: Apr. 10, 1997

[87] PCT Pub. No.: WO95/26314

PCT Pub. Date: Oct. 5, 1995

[30] Foreign Application Priority Data

Mar. 26, 1994 [DE] Germany ............... 44 10 597

[51] Int. Cl.[7] .................................................. B01D 61/00
[52] U.S. Cl. .................. 95/1; 95/19; 95/45; 95/50; 96/4; 96/397
[58] Field of Search ............... 95/19, 45, 1, 46, 95/47, 50, 54; 96/4, 6, 397; 55/311, 339, 385.4, 417

[56] References Cited

U.S. PATENT DOCUMENTS 5,464,466  11/1995  Nanaji et al. .............................. 95/45

FOREIGN PATENT DOCUMENTS

| 0329962 | 8/1989 | European Pat. Off. . |
|---|---|---|
| 8702074 | 6/1987 | Germany . |
| 9205552 | 10/1993 | Germany . |
| 4224170 | 2/1994 | Germany . |
| 93/22031 | 11/1993 | WIPO . |
| 95/13984 | 5/1995 | WIPO . |

OTHER PUBLICATIONS

Energie, vol. 45, No. 6, Jun. 1993, pp. 29–35.
Letter dated Oct. 29, 1993 from H. Hartsell, Jr. to K. Ohlrogge and Secrecy Agreements dated Oct. 8 and 19, 1993.
Letter dated Oct. 29, 1993 from S. Nanaji to K. Ohlrogge.
Letter dated Nov. 26, 1993 from K. Ohlrogge to H. Hartsell.
Letter dated Dec. 22, 1993 from H. Hartsell, Jr. to K. Ohlrogge.
Telefax dated Jan. 3, 1994 from K. Ohlrogge to H. Hartsell, Jr.
Telefax dated Jan. 20, 1994 from K. Ohlrogge to H. Hartsell, Jr.
Memorandum dated Jan. 24, 1994 with English translation re offer to Gilbarco Inc.
Letter dated Feb. 3, 1994 from GKSS to Gilbarco Inc. including accompanying letter dated Feb. 2, 1994.
Letter dated Feb. 16, 1994 from GKSS to Gilbarco Inc.
Telefax dated Mar. 15, 1994 from C. Hartsell to K. Ohlrogge including draft of letter.
Telefax dated Mar. 18, 1994 from K. Ohlrogge to H. Hartsell, Jr.

(List continued on next page.)

Primary Examiner—C. Scott Bushey
Attorney, Agent, or Firm—Jacobson, Price, Holman & Stern, PLLC

[57] ABSTRACT

A method and apparatus is disclosed for separating a vapor-gas mixture formed above a liquid in a tank and which mixture is exhausted from the tank through an exhaust line in order to relieve overpressure in the tank. The mixture is passed from the tank through a membrane unit having a separating membrane and underpressure is generated at least intermittently, on a permeate side of the membrane unit, by a pump. This produces on the permeate side of the membrane permeate enriched with vapor and on the retentate side of the membrane retentate deleted in vapor. The permeate is returned to the tank and the retentate is exhausted to the atmosphere via the exhaust line.

6 Claims, 2 Drawing Sheets

OTHER PUBLICATIONS

Letter dated Mar. 18, 1994 from S. Nanaji to K. Ohlrogge including Mar. 15, 1994 purchase order.
Telefax dated Mar. 21, 1994 from K. Ohlrogge to H. Hartsell, Jr.
Telefax dated May 9, 1994 from K. Ohlrogge to S. Nanaji.
Fax dated May 11, 1994 between S. Nanaji and K. Ohlrogge.
Fax dated May 18, 1994 from S. Nanaji to K. Ohlrogge.
Letter dated Jun. 3, 1994 from GKSS to Gilbarco Inc.

"Operating Experience with Membrane Systems in Gasoline Tank Farms", presented by K. Ohlrogge at the 1991 9th Annual Membrane Technology/Planning Conference in Newton, Mass., Nov. 4–6, 1991.

"Volatile Organic Compound Control Technology by Means of Membranes", presented by K. Ohlrogge at the 1993 11th Annual Annual Membrane Technology/Separation Planning Conference in Newton, Mass., Oct. 11–13, 1993.

METHOD AND APPARATUS FOR REDUCING EMISSIONS FROM BREATHER LINES OF STORAGE TANKS

BACKGROUND OF THE INVENTION

This invention relates to a method and apparatus for separating a vapor-gas mixture formed above a liquid in a tank, the mixture being exhausted from the tank via an exhaust line in order to relieve overpressure. In particular, the invention relates to a method and apparatus for separating a mixture of hydrocarbon vapors and gases which is to be exhausted from, e.g., an underground tank for liquid hydrocarbons, particularly motor fuels, for the purpose of relieving overpressure in the tank by exhausting material through the breather line of the tank.

In fuel filling stations, the fuel is generally stored in underground tanks which communicate with the atmosphere via at least one ventilation means, a so-called breather line. The objective is to avoid development of excessive overpressure (excessive positive gage pressure) or excessive underpressure (excessive negative gage pressure) in the tank. Particularly when fuel is being added to or removed from the storage tank, the free volume above the liquid level changes, and, in order to equalize pressure, vapor-gas mixture from the free space is exhausted to the atmosphere via the breather line, or, alternatively, air passes from the atmosphere into the tank via said breather line. The pressure in the tank can also vary due to temperature fluctuations in the tank or evaporation of liquid or fluctuations in ambient air pressure outside the tank. Aspiration of air from the surroundings to adjust underpressure in the tank does not present particular problems with regard to, e.g., environmental contamination. Exhausting of vapor-air mixture, rich in fuel vapor, to adjust overpressure in the tank, can be an environmental burden, however, and can be injurious to the health of persons in the area.

So-called active recycling systems are known, for reducing emissions of a vapor-gas mixture when filling the tank of a motor vehicle with fuel from a storage tank. These employ a pump to aspirate the vapor-gas mixture which is developed during such a filling operation, and to return said mixture to the storage tank of the filling station. As a rule, such systems are operated in a manner such that the volume of the recycled vapor-gas mixture equals the volume of the fuel withdrawn. In order to increase the effectiveness of such recycling systems, it is advantageous for the volume of the recycled vapor-gas mixture to be at least equal to the volume of the fuel withdrawn, and preferably greater than that volume. Consequently, where a greater volume of recycle is introduced to the tank than the volume of the fuel withdrawn, the pressure in the storage tank can actually be increased; this overpressure is then relieved by exhausting some of the vapor-gas mixture above the liquid into the atmosphere via the breather line. The filter element (if any) present in the breather line, under the prior art, tends to be inadequate, resulting in emission of a certain amount of fuel vapor, contained in said vapor-gas (vapor-air) mixture. Thus, while no doubt the emissions of toxic substances can be reduced in the immediate vicinity of the filling station pump apparatus (i.e. the delivery nozzle), a certain amount of fuel vapor will be emitted elsewhere at the filling station, because of the necessary pressure equalization, thereby reducing the effectiveness of the emission control system.

SUMMARY OF THE INVENTION

The underlying problem of the present invention is to devise a method and apparatus for reducing harmful emissions in the region of the breather line of a storage tank for liquids, particularly liquids used as motor vehicle fuels.

This problem is solved by a method according to the invention, in that the vapor-gas mixture is passed from the tank through at least one membrane unit having at least one separating membrane, wherein an underpressure is generated at least intermittently, on the permeate side of said membrane unit, by at least one pump provided therefor, and wherein a permeate enriched with vapor of the liquid in the tank is returned to the tank; and in that the retentate depleted in vapor of said liquid is exhausted via the exhaust line. The inventive method can be carried out with simple means. For example, semipermeable gas separation membranes can be employed which are selectively permeable to vapors. In combination with the applied underpressure, the result can be that a very high proportion of the vapors in the vapor-gas mixture passed through the membrane unit is removed. The mixture ultimately exhausted through the exhaust line will thus have minimal, if any, adverse environmental impact.

According to an advantageous refinement of the invention, the pump is actuated when a prescribed overpressure is exceeded in the tank. This saves energy, in that the pump is only in operation when vapor-gas mixture is being exhausted. Also, with this mode of operation the exhaust line including the membrane unit can be used for admitting air to the tank to adjust for underpressure, without the risk of the membrane being soiled by particles of fouling material which may be present in the ambient air, because the pump will be turned off when the air is being admitted.

In another refinement of the invention, the exhaust line can be opened or shut by at least one overpressure valve, and the pump is actuated depending on the position of the valve, the pump being turned on when the valve is open and turned off when the valve is closed. This arrangement avoids escape of liquid to the atmosphere via diffusion from the liquid to the vapor-gas mixture prevailing over the liquid and from the vapor-gas mixture to the atmosphere, which can occur even with the pressures equalized. Very simple means can be used to accomplish this mode of operation. Only one switch is needed, and this may be a mechanical switch, actuatable by the valve body, e.g. the ball of a ball valve, directly causing the pump to be switched on.

In another refinement of the invention, the pump for producing the underpressure on the permeate side of the separating membrane is actuated depending on the position of a valve (or valves) which control(s) delivery of liquid from the tank and/or addition of liquid to the tank, the pump being turned on when the valve is open. This arrangement provides reliable recovery of vapor from the vapor-gas mixture which is exhausted, at times when the fill state of the tank is being actively influenced. The method can be particularly advantageously employed in conjunction with a delivery valve which is part of a delivery apparatus which has a so-called active recycling system of the type described above, for vapor-gas mixtures which arise in transferring liquid, e.g. when fueling a vehicle from the tank. With such a combination, a certain volume of vapor-gas mixture is aspirated at the delivery pump nozzle, which volume is generally greater than the volume of liquid fuel withdrawn from the tank. During the process; pressure is equalized via the breather line, generally without any appreciable intervening pressure increase because the withdrawal (through the fuel delivery apparatus) is occurring at a low rate and the vapor-gas mixture which is being returned via the "active recycling system" is being returned at a low rate. In particular, if an overpressure switch is used to control the pump there is a risk that under conditions of slow exhaust of the vapor-gas mixture the switch will not be triggered because the pressure will not rise, and consequently all of the vapor in the vapor-gas mixture being exhausted will be exhausted to the atmosphere, with none being removed via the separation unit.

An inventive apparatus is also provided according to the invention for separating a vapor-gas mixture formed above a liquid in a tank, which mixture is exhausted from the tank via an exhaust line in order to relieve overpressure. The apparatus is devised in particular for carrying out the inventive method. It is comprised of at least one membrane unit having at least one separating membrane. The inlet for feeding the vapor-gas mixture to the membrane unit is connected to the tank, the outlet for the retentate from the membrane unit is connected to the exhaust line, the outlet for the permeate from the membrane unit, which permeate is enriched in the vapor of the said liquid, is connected to a pump which produces an underpressure on the permeate side of the membrane, and said pump returns the permeate to the tank.

An overpressure switch may be provided, the pressure sensor of which is connected to the interior of the tank, wherein said switch cooperates with the pump which produces an underpressure, such that said pump is actuated when the pressure in the tank exceeds a prescribed value.

In a refinement of the invention, at least one throttle element is provided in the exhaust line, such that excess vapor-gas mixture present in the container cannot be exhausted through the exhaust line at any appreciable rate without developing an overpressure capable of triggering the overpressure switch.

It may be advantageous for the throttle to be in the form of a perforated plate, which may be installed in simple fashion in the exhaust line of the tank, which line is typically in the form of one or more tubular conduits.

According to another refinement of the invention, the exhaust line has at least one overpressure valve whereby the exhaust line can be closed off, and at least one control device comprised of a control switch which cooperates with the overpressure valve and the underpressure-producing pump, so that when said valve is open the pump is operating and when said valve is shut the pump is shut off. This allows the apparatus for separating the vapor-gas mixture being exhausted to be used as an adjunct to a tank for storing liquids (particularly fuels) where the tank has means of completely closing the system.

BRIEF DESCRIPTION OF THE DRAWINGS

The invention will be described in more detail hereinbelow with reference to the accompanying drawings.

DESCRIPTION OF PREFERRED EMBODIMENTS

Figure 1:
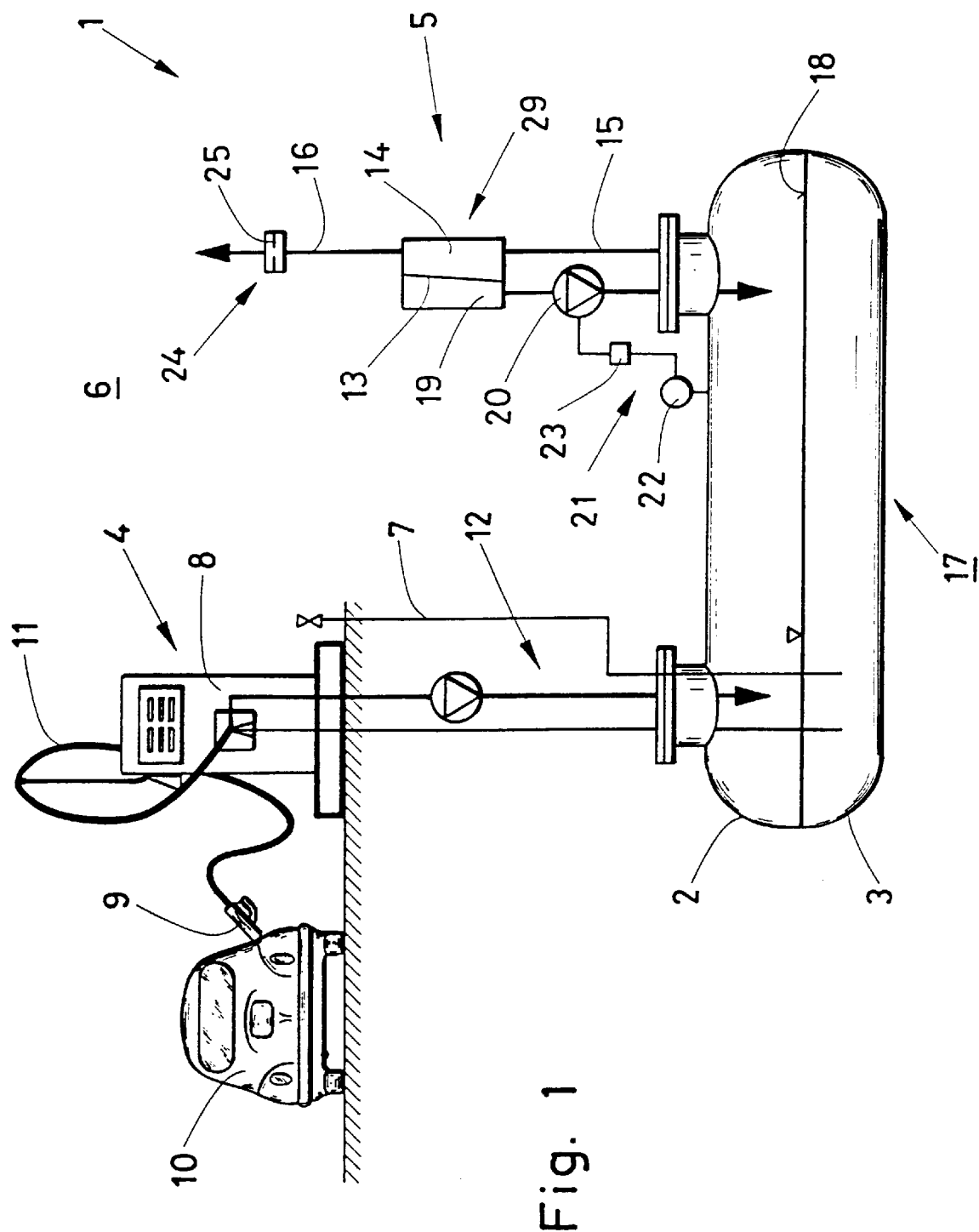
FIG. 1 is a schematic view of a filling station installation provided with an apparatus for carrying out the inventive method.
Figure 2:
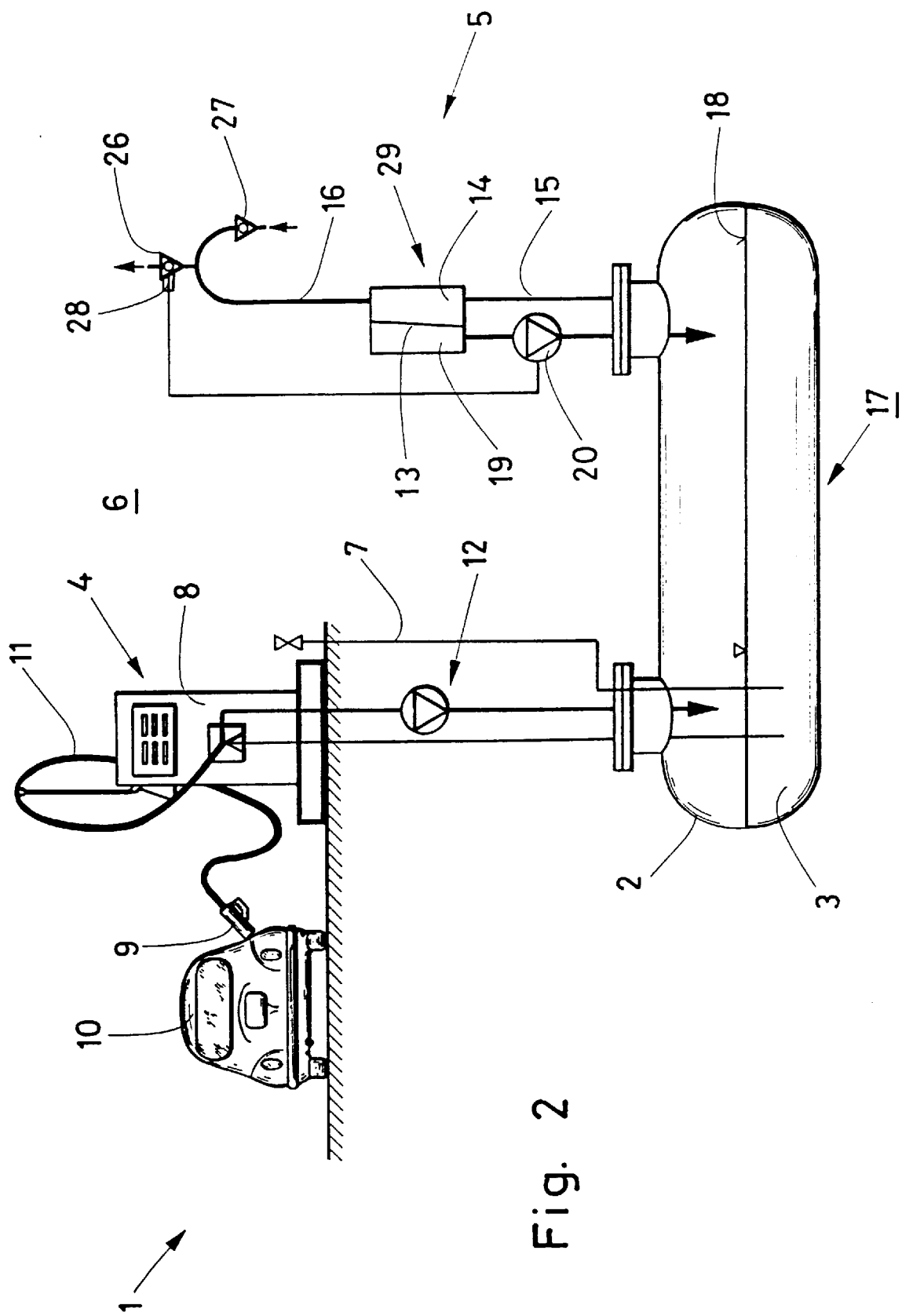
FIG. 2 is a schematic view of a filling station installation provided with an apparatus for carrying out an alternative embodiment of the inventive method.

The exemplary embodiments of the inventive apparatus illustrated in FIGS. 1 and 2 both have essentially the same basic configuration, and differ principally in the means of controlling a vacuum pump for producing an underpressure on the permeate side of a separating membrane. Accordingly, corresponding components and elements are labeled with the same reference numerals in the two Figures.

The filling station shown schematically in FIG. 1 has a storage tank 2 for liquid fuel 3, connected to a vehicle-fueling delivery apparatus 4 supplied therefrom. A ventilation apparatus (breather system) 5 is provided which enables equalization of pressure between the tank 2 and the atmosphere 6. Filling means 7 are also provided through which the fuel can be introduced into the tank 2.

The vehicle-fueling apparatus 4 is comprised of a delivery pump apparatus 8 which delivers liquid fuel to a vehicle 10 via a flexible hose 11 which leads to the vehicle-fueling delivery nozzle 9. The fueling apparatus 4 also has an active recycling system 12 (not shown in detail) for returning to the tank certain volumes of vapor-gas mixture which are evolved in the course of the vehicle fueling. Recycling systems of this type (12) are generally known and will not be described in more detail here.

The ventilation apparatus 5 has a membrane apparatus 29 which employs a separating membrane 13. The inlet to the retentate side 14 of the membrane 13 i.e. the unit 29 is connected to the tank 2 via a line 15, and the outlet of the retentate side is connected to the exhaust line 16 which eventually opens out to the atmosphere 6. The line 15 is open in the upper region 17 of the tank 2 above the liquid level 18 in the tank. Thus, vapor-gas mixture (comprising fuel vapor and air) from the tank 2 which mixture is to be vented can be exhausted to the atmosphere 6 only via line 15, membrane unit 29, and exhaust line 16.

The permeate side 19 of the membrane unit 29 is connected to the underpressure side of a vacuum pump 20 which pump communicates with the tank 2. The pump 20 when in operation applies an underpressure to the permeate side 19 of the membrane unit 29, to promote permeation of fuel vapor through membrane 13 from the vapor-air mixture flowing through the membrane unit. Membrane 13 is advantageously a semi-permeable gas separation membrane. The permeate thereby enriched in fuel vapor can be returned to tank 2 by means of vacuum pump 20.

In the exemplary embodiment according to FIG. 1 an overpressure switch system 21 is provided which is comprised of a pressure sensor 22 disposed in the upper region 17 of tank 2, and a switch 23 which, in coordination with sensor 22, controls the vacuum pump 20. The switch system 21 is chosen and adjusted such that when the pressure in tank 2 exceeds a predetermined value the switch 23 is actuated, starting the vacuum pump 20. The vapor-air mixture present under conditions of overpressure in the tank 2 is subjected to exhausting to relieve the overpressure. As said mixture flows through the membrane unit 29, vapor is separated out from it with the aid of the underpressure applied to the membrane 13. The retentate eventually exhausted through the exhaust line 16 is thus largely free of fuel vapor. The exhaust line 16 has a throttle element 24 in the form of a perforated plate 25, to develop sufficient pressure in the tank 2 to trigger the overpressure switch 21.

In the embodiment illustrated in FIG. 2 the exhaust line 16 has an overpressure valve 26 which opens to allow exhaust of vapor-gas mixture. An underpressure valve 27 is also provided to allow aspiration of ambient air when an underpressure is present in the tank 2. overpressure valve 26 is associated with a control switch 28 which cooperates with the vacuum pump 20. The arrangement is chosen and adjusted such that the control switch 28 is actuated when valve 26 is open, i.e. when vapor-gas mixture is being exhausted, whereby switch 28 turns on the pump 20. This provides a reliable system for carrying out the separation process in the membrane unit 29 when vapor-gas mixture is to be exhausted.

It can be readily appreciated that the embodiments illustrated in the drawings facilitate reliable reduction of emissions of vapor in the region of the breather line of a tank of a filling station. Means may also be provided to enable the pump 20 to be switched on in coordination with the actuation of the delivery valve of the fueling apparatus 4 or in coordination with the filling valve of the filling system 7. In particular, when an active recycling system 12 is employed whereby vapor-gas mixture which is developed in the course of fueling a vehicle is returned to the tank 2, means can be provided whereby said return mixture undergoes separation in the membrane unit 29 and the retentate therefrom is exhausted through exhaust line 16 without any (or with only minor) pressure buildup inside the tank 2.

What is claimed is:

1. A method for separating a vapor-gas mixture formed above a liquid in a tank, which mixture is exhausted from the tank via an exhaust line in order to relieve overpressure in the tank, comprising passing the vapor-gas mixture from the tank through at least one membrane unit having at least one separating membrane, generating an underpressure at least intermittently, on a permeate side of said membrane unit, by at least one pump to provide on the permeate side of the membrane permeate enriched with vapor of the liquid, returning said permeate to the tank to provide on a retentate side of the membrane retentate depleted in vapor of said liquid, exhausting the retentate to the atmosphere via the exhaust line, and opening and shutting the exhaust line by at least one overpressure valve and actuating the pump depending on the position of said valve, the pump being turned on when the valve is open and turned off when the valve is closed.

2. A method for separating a vapor-gas mixture formed above a liquid in a tank, which mixture is exhausted from the tank via an exhaust line in order to relieve overpressure in the tank, comprising passing the vapor-gas mixture from the tank through at least one membrane unit having at least one separating membrane, generating an underpressure at least intermittently, on a permeate side of said membrane unit, by at least one pump to provide on the permeate side of the membrane permeate enriched with vapor of the liquid, returning said permeate to the tank to provide on a retentate side of the membrane retentate depleted in vapor of said liquid, exhausting the retentate to the atmosphere via the exhaust line, and actuating the pump depending on the position of a valve which controls delivery of liquid from the tank and addition of liquid to the tank, the pump being turned on when the valve is open.

3. An apparatus for separating a vapor-gas mixture formed above a liquid in a tank, comprising an exhaust line for exhausting the vapor-gas mixture from the tank in order to relieve overpressure, at least one membrane unit having at least one separating membrane, an inlet to the membrane unit for feeding the vapor-gas mixture to the membrane unit from the tank, a first outlet from a retentate side of the membrane unit connected to the exhaust line for delivering retentate depleted in vapor to the exhaust line, a second outlet from a permeate side of the membrane unit for permeate enriched in vapor and a pump connected to the second outlet to provide an underpressure on the permeate side of the membrane unit and return the permeate to the tank via a return line, wherein the exhaust line includes at least one overpressure valve and a control switch is provided which cooperates with the overpressure valve and the pump for operating the pump when said valve is open and shutting off the pump when said valve is shut.

4. Process for separating a mixture of liquid vapor and gas, which is produced above a liquid in a tank and which is conveyed from the tank through at least one membrane device with at least one separating membrane, on whose permeate side a negative pressure is produced by means of at least one pump device, and a permeate, enriched with the liquid vapor, is returned into the tank, comprising that to compensate for the overpressure the mixture of liquid vapor and gas is discharged in such a manner through a pipe from the tank that a retentate, largely free of liquid vapor, is discharged through an outlet pipe, whereby the pump device is actuated as a function of the overpressure prevailing in the tank as soon as a specific overpressure is exceeded, wherein the outlet pipe can be closed by at least one overpressure valve and the pump device is actuated when the overpressure valve is open and deactivated when the overpressure valve is closed as a function of the position of the overpressure valve.

5. Process as claimed in claim 4, wherein the pump device is actuated when the overpressure valve is open as a function of the position of a filling valve of the tank for the liquid.

6. Device for separating a mixture of liquid vapor and gas, which is produced above a liquid in a tank and which can be discharged from the tank through a pipe and subsequently through an outlet pipe in order to compensate for an overpressure, comprising at least one membrane device with at least one separating member, whose feed side for the mixture of liquid vapor and gas is connected to the tank and whose retentate side is connected to the outlet pipe, whereby in order to return a permeate, enriched with the liquid vapor, a permeate side is connected to the tank by means of a pump device in order to generate an underpressure on the permeate side of the separating member and further comprising an overpressure transducer, whose pressure sensor is connected to the interior of the tank and which interacts in such a manner with the pump to generate a negative pressure that, when a specific overpressure is exceeded, the pump is actuated, wherein the outlet pipe has at least one overpressure valve, and further comprising at least one controller, which has a control switch and which interacts in such a manner with the overpressure valve and the pump to generate a negative pressure so that the pump is actuated when the overpressure valve is open and is deactuated when the overpressure valve is closed.

* * * * *